United States Patent
Lowe et al.

(10) Patent No.: US 9,384,161 B2
(45) Date of Patent: Jul. 5, 2016

(54) METHOD FOR DATA THROUGHPUT IMPROVEMENT IN OPEN CORE PROTOCOL BASED INTERCONNECTION NETWORKS USING DYNAMICALLY SELECTABLE REDUNDANT SHARED LINK PHYSICAL PATHS

(75) Inventors: Kerry S. Lowe, Folsom, CA (US); Peter M. Ewert, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 13/994,303

(22) PCT Filed: Aug. 22, 2011

(86) PCT No.: PCT/US2011/048627
§ 371 (c)(1),
(2), (4) Date: Jun. 14, 2013

(87) PCT Pub. No.: WO2013/028170
PCT Pub. Date: Feb. 28, 2013

(65) Prior Publication Data
US 2013/0268710 A1    Oct. 10, 2013

(51) Int. Cl.
*G06F 13/40*    (2006.01)

(52) U.S. Cl.
CPC ........ *G06F 13/4027* (2013.01); *G06F 13/4022* (2013.01); *Y02B 60/1228* (2013.01); *Y02B 60/1235* (2013.01)

(58) Field of Classification Search
CPC ......... G06F 13/12; G06F 13/14; G06F 13/20; G06F 13/36; G06F 13/38; G06F 13/40; G06F 13/4004; G06F 13/4027; G06F 13/404; G06F 13/4045; G06F 15/173; G06F 15/17356; G06F 15/17362; G06F 13/4022; Y02B 60/1235; Y02B 60/1228
See application file for complete search history.

(56) References Cited

U.S. PATENT DOCUMENTS

| 4,731,825 | A  * | 3/1988  | Wojcinski et al. ............ 379/273 |
| 6,327,260 | B1 * | 12/2001 | McGrew ...................... 370/385 |

(Continued)

FOREIGN PATENT DOCUMENTS

| JP | 4668331 B2 | 4/2011 |
| WO | 2013/028170 A1 | 2/2013 |

OTHER PUBLICATIONS

"Open Core Protocol Specification". Release 2.2. Document Revision 1.0. 2006. OCP-IP Association.*

(Continued)

*Primary Examiner* — Thomas J Cleary
(74) *Attorney, Agent, or Firm* — Law Office of R. Alan Burnett, PS

(57) ABSTRACT

Methods and apparatus for facilitating data throughput improvements in interconnect fabrics employing point-to-point links using dynamically selectable routing. Initiators and targets are operatively coupled to first and second fabrics. The first and second fabrics include multiple point-to-point internal links and are communicatively coupled to one another via multiple fabric-to-fabric links, including first and second links from the first fabric to the second fabric. During operations, traffic on the first fabric-to-fabric link is detected to determine if it is busy, and depending on the determination, data transfers from an initiator coupled to the first fabric destined for a target coupled to the second fabric are selectively routed via either the first or second fabric-to-fabric links.

19 Claims, 8 Drawing Sheets

(56) References Cited

U.S. PATENT DOCUMENTS

| | | | |
|---|---|---|---|
| 6,345,330 B2 * | 2/2002 | Chu | 710/65 |
| 8,037,230 B2 | 10/2011 | Shoemaker et al. | |
| 2003/0142628 A1 * | 7/2003 | Alonso et al. | 370/241 |
| 2003/0191857 A1 | 10/2003 | Terrell et al. | |
| 2003/0208611 A1 | 11/2003 | Weber et al. | |
| 2004/0151174 A1 * | 8/2004 | Del Signore et al. | 370/389 |
| 2005/0036499 A1 * | 2/2005 | Dutt et al. | 370/401 |
| 2006/0023751 A1 * | 2/2006 | Wilson et al. | 370/474 |
| 2007/0088891 A1 * | 4/2007 | Kelly et al. | 710/301 |
| 2007/0091903 A1 * | 4/2007 | Atkinson | 370/401 |
| 2007/0268973 A1 * | 11/2007 | Fanson | 375/257 |
| 2008/0025208 A1 * | 1/2008 | Chan | 370/217 |
| 2008/0155149 A1 * | 6/2008 | de Araujo et al. | 710/107 |
| 2008/0320181 A1 * | 12/2008 | Lauterbach et al. | 710/38 |
| 2008/0320254 A1 | 12/2008 | Wingard et al. | |
| 2008/0320268 A1 | 12/2008 | Wingard et al. | |
| 2009/0161401 A1 * | 6/2009 | Bilger et al. | 365/51 |
| 2009/0198957 A1 * | 8/2009 | Arimilli et al. | 712/29 |
| 2010/0257380 A1 * | 10/2010 | Huang | G06F 1/266 713/300 |
| 2010/0330741 A1 * | 12/2010 | Huang | H01L 23/3128 438/107 |
| 2011/0022356 A1 * | 1/2011 | Nussbaum | G06F 1/3203 702/182 |
| 2011/0191488 A1 * | 8/2011 | Wong | G06F 15/16 709/231 |
| 2012/0005473 A1 * | 1/2012 | Hofstee | G06F 15/7867 713/100 |
| 2012/0331188 A1 * | 12/2012 | Riordan et al. | 710/33 |

OTHER PUBLICATIONS

"Open Core Protocol Specification". Release 3.0. Document Revision 1.0. 2013. OCP-IP Association.*

Newton, Harry. "Newton's Telecom Dictionary". 19th Edition. Mar. 2003. CMP Books. ISBN 1-57820-307-4. p. 467.*

"ATIS Telecom Glossary 2007". Entry 'link'. Alliance for Telecommunications Industry Solutions. Online Jul. 8, 2010. Retrieved from Internet Jan. 7, 2016. <https://web.archive.org/web/20100709002316/http://www.atis.org/glossary/definition.aspx?id=4188>.*

"Wikipedia, the free encyclopedia". Entry 'Telecommunications link'. Online Nov. 17, 2012. Retrieved from Internet Jan. 7, 2016. <https://en.wikipedia.org/w/index.php?title=Telecommunications_link&oldid=523499090>.*

International Search Report and Written opinion received for PCT Application No. PCT/US2011/048627, mailed on Mar. 26, 2012, 10 pages.

Office Action received for Korean Patent Application No. 2014-7004701, mailed on Sep. 25, 2014, 9 pages of Office Action including 4 pages of English Translation.

International Preliminary Report on Patentability and Written Opinion received for PCT Patent Application No. PCT/US2011/048627, mailed on Mar. 6, 2014, 6 pages.

Office Action received for Korean Patent Application No. 2014-7004701, mailed on Mar. 26, 2015, 3 pages of English Translation and 3 pages of Korean Office Action.

Office Action received for Korean Patent Application No. 2014-7004701, mailed on May 20, 2015, 3 pages of English translation and 3 pages of Korean Office Action.

* cited by examiner

METHOD FOR DATA THROUGHPUT IMPROVEMENT IN OPEN CORE PROTOCOL BASED INTERCONNECTION NETWORKS USING DYNAMICALLY SELECTABLE REDUNDANT SHARED LINK PHYSICAL PATHS

FIELD OF THE INVENTION

The field of invention relates generally to computer system interfaces and, more specifically but not exclusively relates to techniques for enhancing data throughput performance of interconnections on System on a Chip (SoC)s and the like

BACKGROUND INFORMATION

Computer systems typically employ one or more interconnects to facilitate communication between system components, such as between processors and memory. Interconnects and/or expansion interfaces may also be used to support built-in and add on devices, such as IO (input/output) devices and expansion cards and the like. For many years after the personal computer was introduced, the primary form of interconnect was a parallel bus. Parallel bus structures were used for both internal data transfers and expansion buses, such as ISA (Industry Standard Architecture), MCA (Micro Channel Architecture), EISA (Extended Industry Standard Architecture) and VESA Local Bus. In the early 1990's Intel Corporation introduced the PCI (Peripheral Component Interconnect) computer bus. PCI improved on earlier bus technologies by not only increasing the bus speed, but also introducing automatic configuration and transaction-based data transfers using shared address and data lines.

As time progressed, computer processor clock rates where increasing at a faster pace than parallel bus clock rates. As a result, computer workloads were often limited by interconnect bottlenecks rather than processor speed. Although parallel buses support the transfer of a large amount of data (e.g., 32 or even 64 bits under PCI-X) with each cycle, their clock rates are limited by timing skew considerations, leading to a practical limit to maximum bus speed. To overcome this problem, high-speed serial interconnects were developed. Examples of early serial interconnects include Serial ATA, USB (Universal Serial Bus), FireWire, and RapidIO.

Another standard serial interconnect that is widely used is PCI Express, also called PCIe, which was introduced in 2004 under the PCIe 1.0 standard. PCIe was designed to replace older PCI and PCI-X standards, while providing legacy support. PCIe employs point-to-point serial links rather than a shared parallel bus architecture. Each link supports a point-to-point communication channel between two PCIe ports using one or more lanes, with each lane comprising a bi-directional serial link. The lanes are physically routed using a crossbar switch architecture, which supports communication between multiple devices at the same time. As a result of its inherent advantages, PCIe has replaced PCI as the most prevalent interconnect in today's personal computers. PCIe is an industry standard managed by the PCI-SIG (Special Interest Group). As such, PCIe pads are available from many ASIC and silicon vendors.

Recently, Intel introduced the QuickPath Interconnect® (QPI). QPI was initially implemented as a point-to-point processor interconnect replacing the Front Side Bus on platforms using high-performance processors, such as Intel® Xeon®, and Itanium® processors. QPI is scalable, and is particularly advantageous in systems having multiple processors employing shared memory resources. QPI transactions employ packet-based transfers using a multi-layer protocol architecture. Among its features is support for coherent transaction (e.g., memory coherency).

Also recently introduced is the Open Core Protocol, which is an openly licensed, core-centric protocol intended to meet contemporary system level integration challenges. OCP defines a bus-independent, configurable and scalable interface for on-chip subsystem communications. The current version of the OCP specification is the OCP 3.0 specification (updates prior version OCP 2.2), both of which are available for download at ocpip.org.

Other recent advancements include multi-core processors, multi-function SoCs, and higher density cores and dies. At the same time, premiums are put on reducing power consumption, particularly for mobile platforms. In order to take advantage of the scalability offered by these advances, the various and sometimes conflicting constraints need to be addressed. For example, when cross-bar interconnects (aka, fabrics) are implemented in an SoC, latency and power consumption increases as a function of the number of IP blocks connected to the fabric. At the same time, point-to-point virtual links facilitated by such cross-bar interconnects can provide substantial inter-IP block communication throughput. Accordingly, it would be advantageous to implement scalable architectures that support enhanced throughputs without corresponding power consumption increases.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1A:
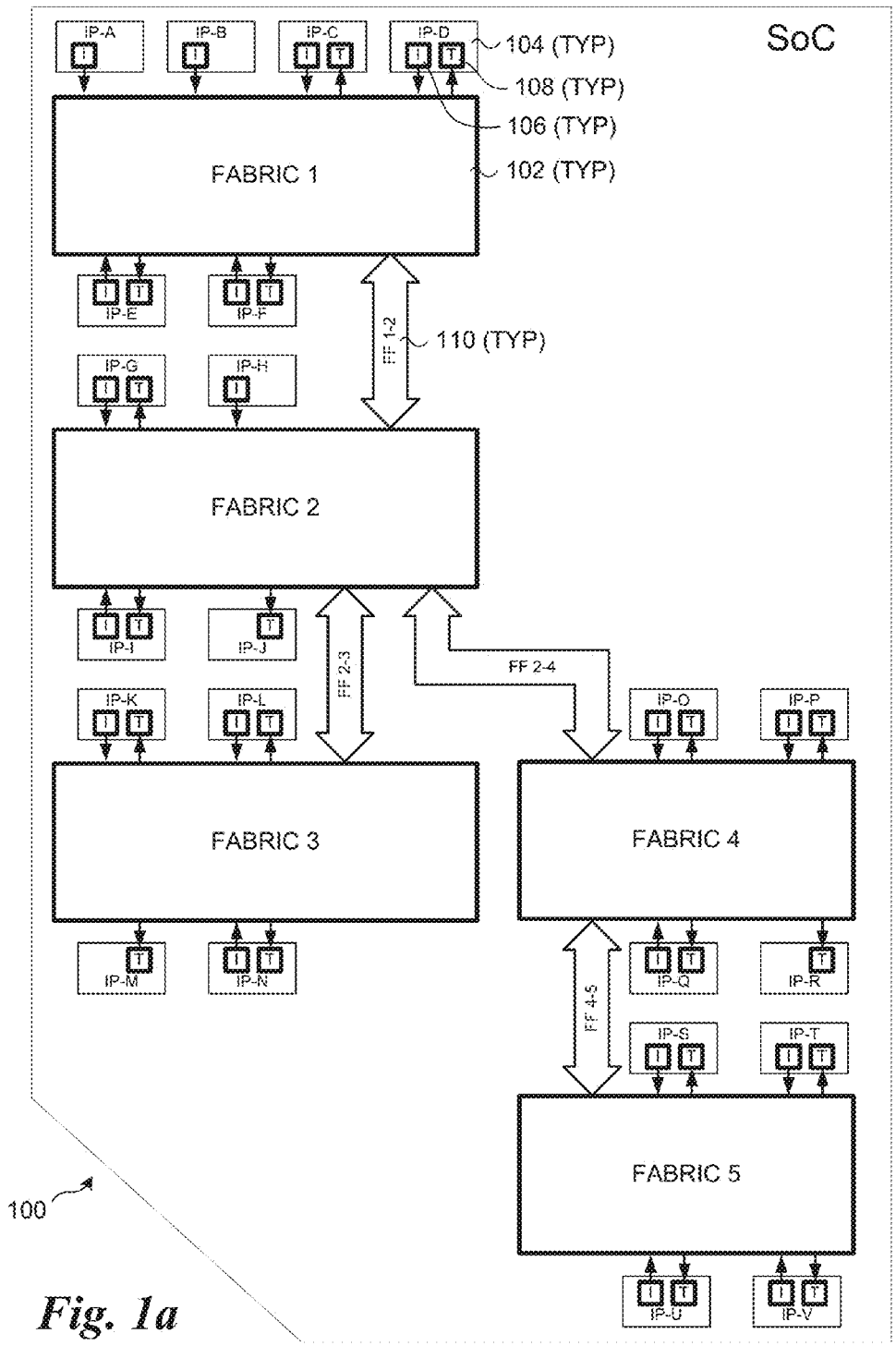
FIG. 1a shows an SoC architecture including a hierarchical set of fabrics and corresponding fabric-to-fabric links.

Embodiments of methods and apparatus for facilitating data throughput improvements in interconnect fabrics using dynamically selectable redundant shared links are described herein. In the following description, numerous specific details, such as implementations employing OCP interconnects, are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. For example, the labeling of the nodes or blocks in various Figures provides information identifying the node/block and/or its function; such information cannot be conveyed alone with separate reference numbers. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity.

As discussed above, computer architectures are moving away from discreet component architectures towards SoC-based architectures. Modularity is also a key aspect of SoC architectures. Typically, the system designer will integrate various functional blocks, including functional blocks that are commonly referred to in the industry as Intellectual Property (IP) cores, IP blocks, or simply IP. For the purposes herein, these functional blocks are generally referred to as IP blocks or simply "IP"; it will be understood that the terminology IP blocks or IP also covers IP cores and any other component or block generally known as IP, as would be understood by those in the SoC development and manufacturing industries. These IP blocks generally serve one or more dedicated functions and often comprise existing circuit design blocks that are licensed from various vendors or developed in-house. In order to integrate these IP blocks, various interfaces are designed into the SoC.

FIG. 1a shows an exemplary SoC architecture 100 that employs multiple interconnect fabrics 102 that are configured in a hierarchical manner. The term hierarchical means that the interconnection network comprises an interconnected set of sub-networks that are commonly referred to as interconnect fabrics or simply fabrics. For convenience, the fabrics will generally be referred to herein by their labels (e.g., Fabric 1, Fabric 2, etc.), rather than a separate reference number for each fabric. Accordingly, SoC architecture includes Fabrics 1-5, each operating as an independent sub-net that is interconnected to the other fabrics to facilitate communication across multiple sub-nets as explained below. Various IP blocks (also referred to by the OCP specification as IP cores) 104 are shown connected to corresponding fabrics in SoC architecture 100; these IP blocks are labeled A-V and will be referenced herein by their letter labels for convenience. The various IP blocks are representative of components or functional units (i.e., functional blocks) typically employed in SoC designs, including but not limited to processor cores, memory cache components and agents, memory controllers, I/O controllers and interfaces, peripherals and peripheral interfaces, video and audio components and interfaces, platform management components, etc.

Figure 5:
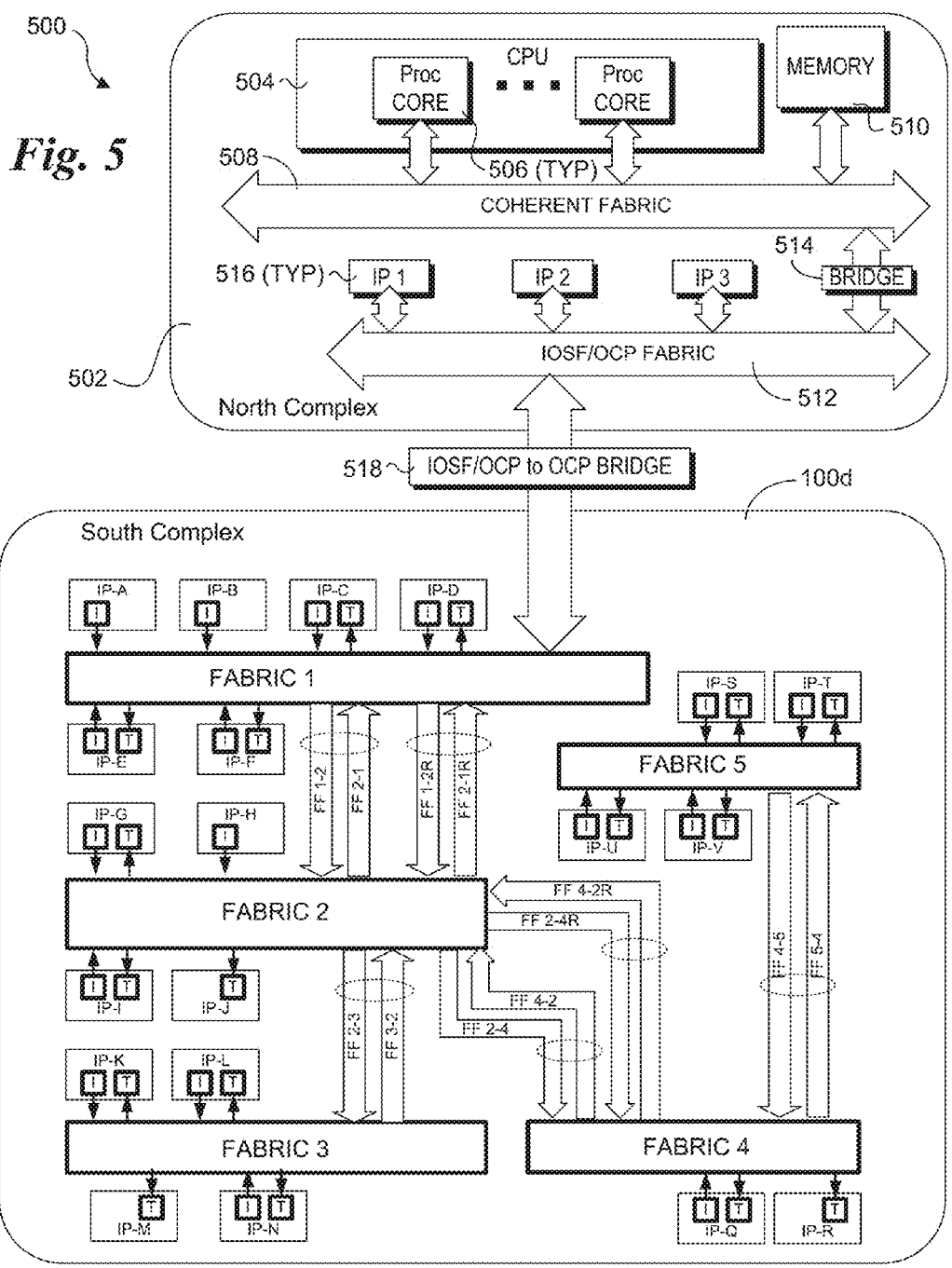
FIG. 5 is a block diagram of an exemplary SoC in which a bridge hierarchy is implemented in a south complex.

Interconnect fabrics, such as depicted by Fabrics 1-5 in FIG. 1a support communication between the IP blocks using corresponding wiring and protocols. In general, the structure of a given interconnect fabric may comprise a full cross-bar "mesh," a loosely populated fabric comprising a plurality of point-to-point links, a shared bus-type architecture, or a ring-type topology. In one embodiment, SoC architecture 100 is generalized such that each of the Fabrics 1-5 may be configured in any of these topologies. Also, the particular interconnect structure and protocols are also generalized in SoC architecture 100, such that the various fabrics may employ the same or different interconnect structures and protocols. For example, it may be desirable to employ an interconnect that supports a cache coherency protocol (e.g., QPI), for communication between processor cores and memory cache-related IP blocks, while other structures and protocols, such as OCP, may be used for other fabrics in the architecture. Optionally, a single protocol may be used for the entire architecture, or the fabric structures depicted in FIG. 1a may depict a portion of an SoC. For example, in one embodiment, SoC architecture 100 corresponds to a South complex in an SoC architecture, such as shown in FIG. 5 and described below.

In one embodiment, each of Fabrics 1-5 comprises an OCP fabric. Under the Open Core Protocol, communications are initiated by an initiator (I) and directed over the fabric to a target (T), as described in detail below. Accordingly, Initiator blocks 106 (I) and Target blocks 108 (T) are depicted inside respective IP blocks A-V in FIG. 1. In general, an Initiator block I or Target block T depicts interface circuitry for facilitating communication between an IP block and the fabric it is coupled to, and accordingly, Initiator and Target blocks may also refer to Initiator and Target interfaces in the IP blocks depicted herein.

Also depicted in SoC architecture 100 are a plurality of fabric-to-fabric links 110 that are employed for coupling pairs of fabrics in communication. These are labeled FF n-m, where n indicates one of the fabrics being coupled, and m represents the other one. For instance, fabric-to-fabric link FF 1-2 facilitates communication between Fabric 1 and Fabric 2. Although referred to as fabric-to-fabric links, these links may also function as fabric-to-fabric bridges in instances under which the connected fabrics employ different structures and protocols (e.g., a QPI-to-OCP bridge), or instances in which the clocking speeds of a pair of connected fabrics employing the same protocol are different.

In FIG. 1a, various IP blocks 104 are depicted to include both an Initiator block I and/or a Target block T, indicating the interface capability with the OCP fabric for the various IP blocks may differ. For example, peripherals such as audio inputs (microphones) and outputs (speakers) may only require unidirectional communication with other IP blocks, noting, however, that corresponding audio interface components may support either bi-directional or unidirectional communication. In a similar manner, each of fabric-to-fabric links 110 is depicted as a double-headed arrow to indicate support for bi-directional communication across the links. However, reference herein to bi-directional communication does not require bi-directional physical links (that is, a physical link that supports bi-directional communication across its wires). Rather, as explained in further detail below, bi-directional communication between IP blocks or fabrics may be facilitated through use of unidirectional links operating in opposing directions. Alternatively, bi-directional data transfers may occur over a single unidirectional links (i.e., corresponding set of wires are used to support bi-directional data transfers), such as when an initiator performs read and write operations with a target.

Aspects of the embodiments disclosed herein may be advantageously deployed in mobile platforms, such as smartphones and tablets. Power consumption is at a premium for these types of platforms, and thus any reduction in power consumption is beneficial. In accordance with the teachings herein, power consumption may be reduced through the use of a hierarchical interconnect fabric architecture and through the use of dynamically selectable routing across redundant shared physical links.

Compared with shared bus or fully populated crossbar interconnects, hierarchical networks typically have an advantage [1] in power efficiency since selected fabrics can be power gated when not needed and [2] in silicon area since the complexity of a fabric (implemented as a crosspoint) grows as the square of the number of units connected. In general, the use of any active transistor operation or any operation that results in an electrical load on an SoC circuit results in power being consumed. Also, the higher the operating frequency (e.g., clock cycle or frequency) used for circuitry such as interconnects, the higher the power consumption. In view of this, power can be reduced by using less physical interconnect structure (i.e., less "wires" and corresponding interface circuitry, such as buffers and switching logic), and/or operating at lower frequencies. However, in both cases, there is a tradeoff between power consumption and throughput performance.

One way to address the tradeoff is to use lower frequency clock rates for portions of the SoC architecture that don't require higher rates generally associated with processor and memory operations or video operations. For example, Audio components, and peripherals and I/O components that are generally classified as low-speed may be configured to interface to corresponding interconnect fabric blocks operating at lower clock rates. Since the hierarchical nature of SoC architecture 100 supports implementation of separate fabrics, individual fabrics may be operated at lower frequencies of may be put in a standby state or turned "off" state. For example, if audio IP blocks are coupled to a separate fabric, that fabric can be turned off or put in a standby state when no audio functions are required, thus saving battery life.

Another inventive aspect of the present disclosure is the use of redundant physical links that can be dynamically configured to support higher transfer rates under certain operating conditions, while at the same time reduce power consumptions under operating conditions requiring lower transfer rates. In the following embodiments the use of Open Core Protocol compliant fabrics are used to demonstrate implementation aspects of these features. However, it is noted that fabric implementations using other protocols may also be deployed to obtain similar enhancements in data throughput and power reduction.

The Open Core Protocol defines a point-to-point interface between two communicating entities such as IP cores and bus interface modules (bus wrappers), also referred to herein as agents. One entity acts as the master of the OCP instance, and the other as the slave. Only the master can present commands and is the controlling entity. The slave responds to commands presented to it, either by accepting data from the master, or presenting data to the master. For two entities to communicate in a peer-to-peer fashion, there need to be two instances of the OCP connecting them—one where the first entity is a master, and one where the first entity is a slave.

Figure 2:
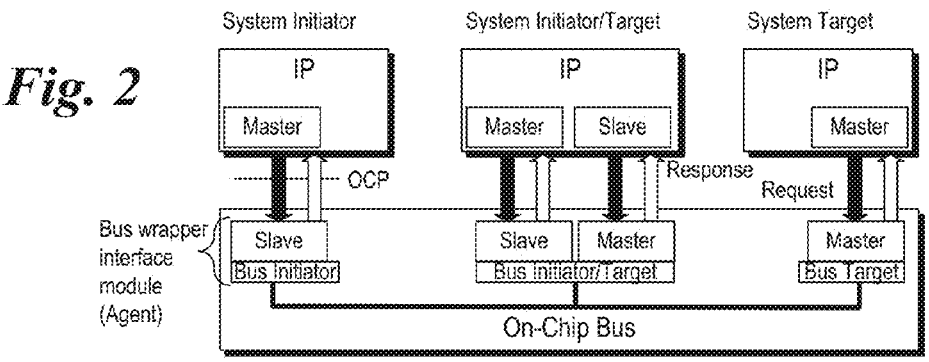
FIG. 2 is a block diagram illustrating basic objects use by the Open Core Protocol.

FIG. 2 shows a simple system containing a wrapped bus and three IP core entities: one that is a system target, one that is a system initiator, and an entity that is both an initiator and a target. It will be understood that generally a "master" and "initiator" are synonymous, and as such, these terms may be used interchangeably herein. Likewise, "slave" and "target" are synonymous and may be used interchangeably.

The characteristics of the IP core determine whether the core needs master, slave, or both sides of the OCP; the wrapper interface modules must act as the complementary side of the OCP for each connected entity. A transfer across this system occurs as follows. A system initiator (as the OCP master) presents command, control, and possibly data to its connected slave (a bus wrapper interface module). The interface module plays the request across the on-chip bus system. The OCP does not specify the embedded bus functionality. Instead, the interface designer converts the OCP request into an embedded bus transfer. The receiving bus wrapper interface module (as the OCP master) converts the embedded bus operation into a legal OCP command. The system target (OCP slave) receives the command and takes the requested action.

Each instance of the OCP is configured (by choosing signals or bit widths of a particular signal) based on the requirements of the connected entities and is independent of the others. For instance, system initiators may require more address bits in their OCP instances than do the system targets; the extra address bits might be used by the embedded bus to select which bus target is addressed by the system initiator.

The OCP is flexible. There are several useful models for how existing IP cores communicate with one another. Some employ pipelining to improve bandwidth and latency characteristics. Others use multiple-cycle access models, where signals are held static for several clock cycles to simplify timing analysis and reduce implementation area. Support for this wide range of behavior is possible through the use of synchronous handshaking signals that allow both the master and slave to control when signals are allowed to change.

Table 1 below lists the basic OCP signals. In general, details relating to various aspects of OCP are provided in Open Core Protocol Specification 2.2 (or 3.0). In addition to the basic OCP, there are various optional signals that may be implemented as defined by the OCP specifications.

TABLE 1

| Name | Width | Driver | Function |
| --- | --- | --- | --- |
| Clk | 1 | varies | Clock input |
| EnableClk | 1 | varies | Enable OCP clock |
| MAddr | configurable | master | Transfer address |
| MCmd | 3 | master | Transfer command |
| MData | configurable | master | Write data |
| MDataValid | 1 | master | Write data valid |
| MRespAccept | 1 | master | Master accepts response |
| SCmdAccept | 1 | slave | Slave accepts transfer |
| SData | configurable | slave | Read data |
| SDataAccept | 1 | slave | Slave accepts write data |
| SResp | 2 | slave | Transfer response |

Clk
    Input clock signal for the OCP clock. The rising edge of the OCP clock is defined as a rising edge of Clk that samples the asserted EnableClk. Falling edges of Clk and any rising edge of Clk that does not sample EnableClk asserted do not constitute rising edges of the OCP clock.

EnableClkEnableClk
   indicates which rising edges of Clk are the rising edges of the OCP clock, that is.
   which rising edges of Clk should sample and advance interface state. Use the enableclk parameter to configure this signal. EnableClk is driven by a third entity and serves as an input to both the master and the slave.
   When enableclk is set to 0 (the default), the signal is not present and the OCP behaves as if EnableClk is constantly asserted. In that case all rising edges of Clk are rising edges of the OCP clock.

MAddr
   The Transfer address, MAddr specifies the slave-dependent address of the resource targeted by the current transfer. To configure this field into the OCP, use the addr parameter. To configure the width of this field, use the addr_wdth parameter.
   MAddr is a byte address that must be aligned to the OCP word size (data_wdth).
   data_wdth defines a minimum addr_wdth value that is based on the data bus byte width, and is defined as:

$$\min\_addr\_wdth = \max(1, \text{floor}(\log 2(data\_wdth)) - 2)$$

If the OCP word size is larger than a single byte, the aggregate is addressed at the OCP word-aligned address and the lowest order address bits are hardwired to 0. If the OCP word size is not a power-of-2, the address is the same as it would be for an OCP interface with a word size equal to the next larger power-of-2.

MCmd
   Transfer command. This signal indicates the type of OCP transfer the master is requesting. Each non-idle command is either a read or write type request, depending on the direction of data flow.

MData
   Write data. This field carries the write data from the master to the slave. The field is configured into the OCP using the mdata parameter and its width is configured using the data_wdth parameter. The width is not restricted to multiples of 8.

MDataValid
   Write data valid. When set to 1, this bit indicates that the data on the MData field is valid. Use the datahandshake parameter to configure this field into the OCP.

MRespAccept
   Master response accept. The master indicates that it accepts the current response from the slave with a value of 1 on the MRespAccept signal. Use the respaccept parameter to enable this field into the OCP.

SCmdAccept
   Slave accepts transfer. A value of 1 on the SCmdAccept signal indicates that the slave accepts the master's transfer request. To configure this field into the OCP, use the cmdaccept parameter.

SData
   This field carries the requested read data from the slave to the master. The field is configured into the OCP using the sdata parameter and its width is configured using the data_wdth parameter. The width is not restricted to multiples of 8.

SDataAccept
   Slave accepts write data. The slave indicates that it accepts pipelined write data from the master with a value of 1 on SDataAccept. This signal is meaningful only when datahandshake is in use. Use the dataaccept parameter to configure this field into the OCP.

SResp
   Response field from the slave to a transfer request from the master. The field is configured into the OCP using the resp parameter.

As can be seen from above, a given OCP link can support bi-directional data traffic (e.g., writing from a Master to a Slave, and reading from a Slave by a Master). However, for clarity herein, the direction of a given link is from its initiator (i.e., Master under OCP) to its target (i.e., Slave under OCP), and are referred to as unidirectional links.

Figure 1B:
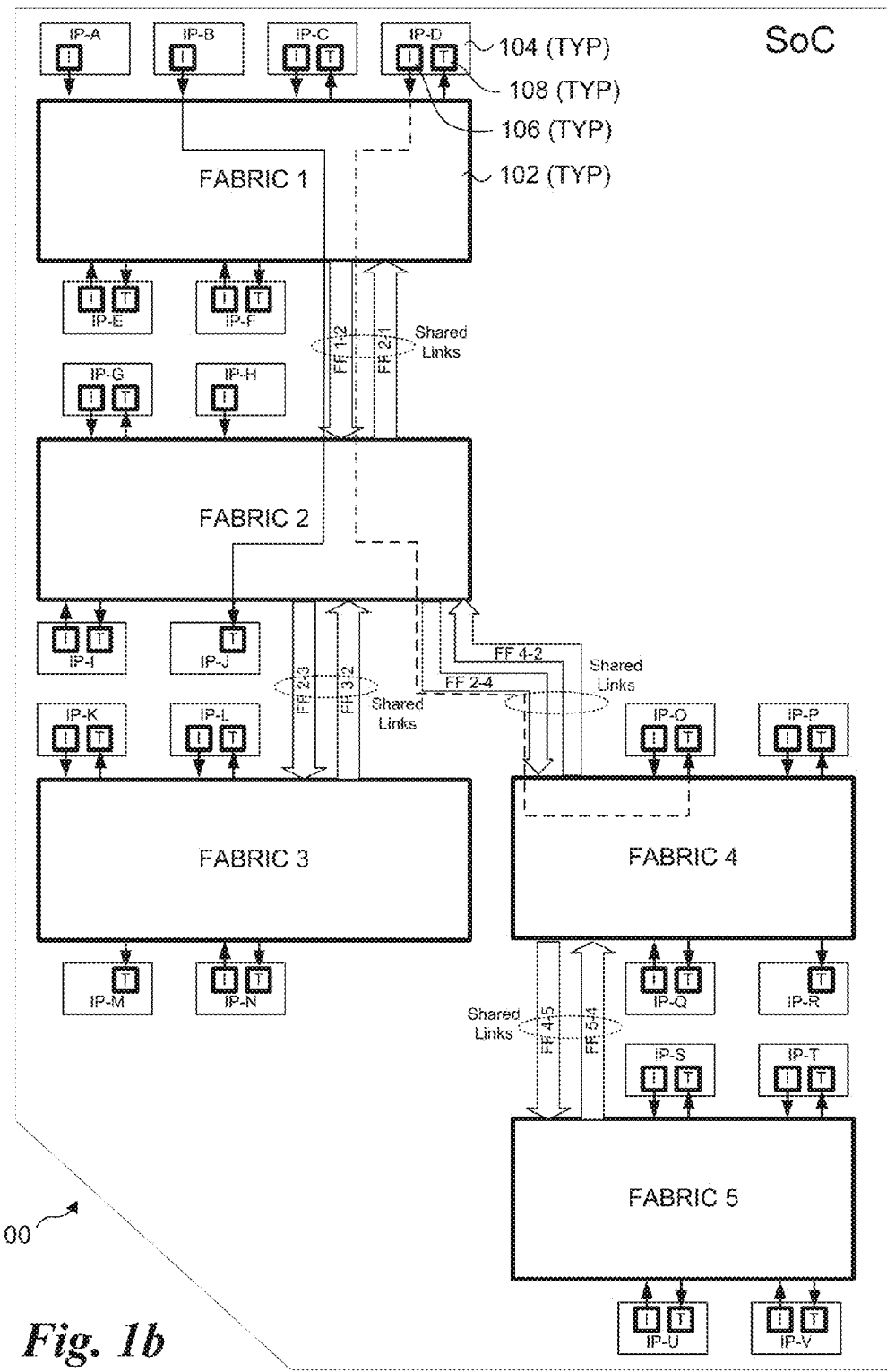
FIG. 1b shows an implementation of the SoC architecture of FIG. 1a, further showing a plurality of shared fabric-to-fabric links.

FIG. 1b shows an example of using shared OCP physical links between OCP fabrics. Each of these links comprises a set of OCP wires with data transfers implemented in accordance with applicable OCP protocol signaling. Each fabric-to-fabric link is labeled FF m-s, wherein m corresponds to the fabric operating as the Master, and s corresponds to the fabric operating as the Slave. For example, the pair of links between Fabrics 1 and 2 are labeled FF 1-2 and FF 2-1.

FIG. 1b also depicts two data transfers initiated by IP blocks IP-B and IP-D connected to Fabric 1 and respectively targeted to IP block IP-J connected to Fabric 2 and IP block IP-O connected to Fabric 4. As can be seen, both of these data transfers employ the same physical data path defined by fabric-to-fabric link FF 1-2, thus depicted as "Shared Links." While this is advantageous for facilitating communication between IP blocks coupled to the various fabrics, it leads to traffic congestion, requiring arbitration of the shared links resulting in bandwidth bottlenecks, thus reducing overall throughput.

Figure 1C:
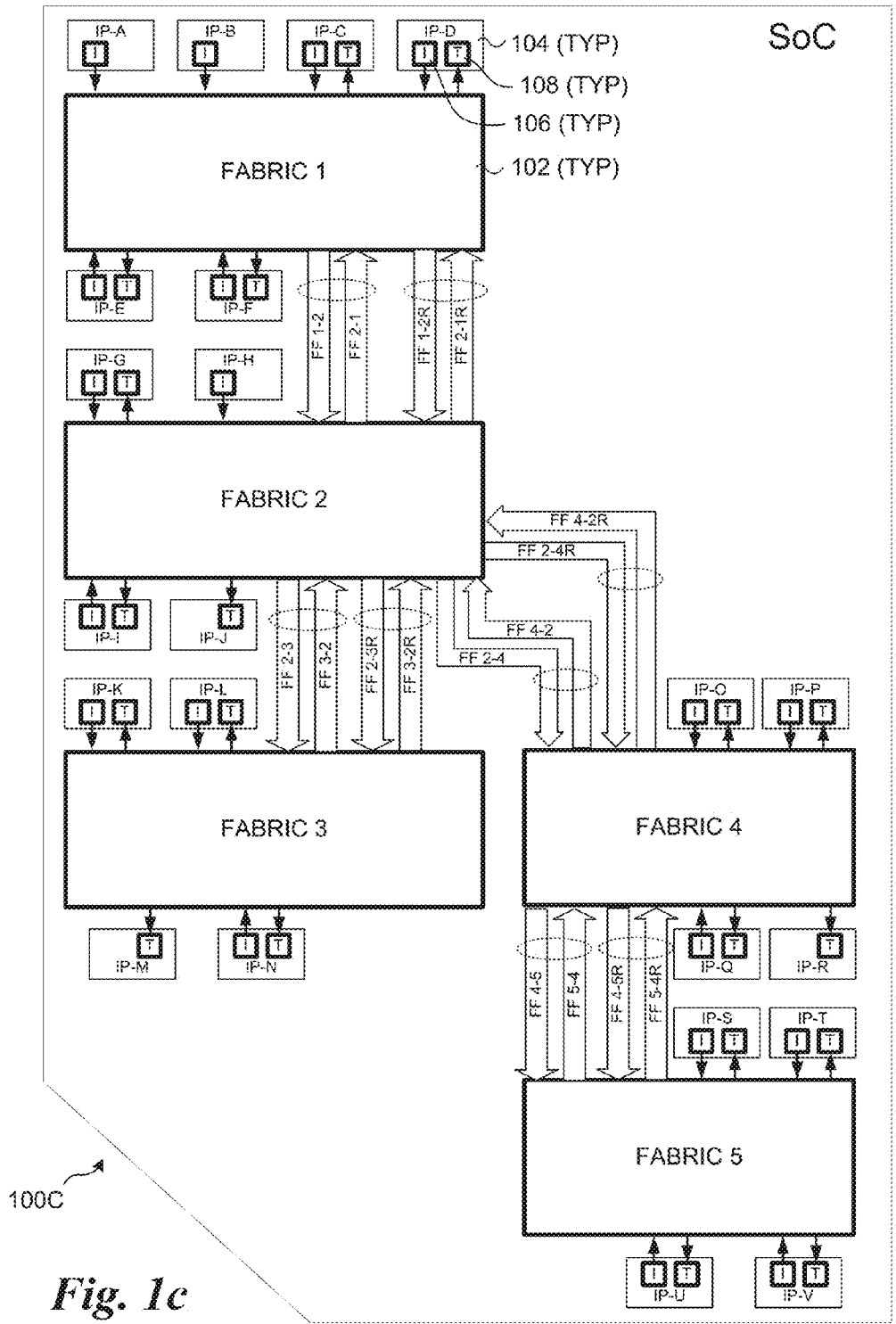
FIG. 1c shows an implementation of the SoC architecture of FIG. 1a, further showing a plurality of redundant fabric-to-fabric links supporting dynamic routing of data between fabrics.

In accordance with teachings herein, one or more redundant fabric-to-fabric links is implemented to reduce traffic congestion and enhance overall throughput. Details of exemplary implementations of such redundant fabric-to-fabric links are shown in FIGS. 1c, 3b and 3c. For example, in SoC architecture 100C of FIG. 1c, a redundant set of fabric-to-fabric OCP links (one in each direction) have been added to architecture 100b of FIG. 1b. As before, each fabric to fabric links is labeled FF m-s, with the addition of an "R" to indicate the link is redundant. It is noted that the inclusion of an addition of a pair of unidirectional links between the fabrics in FIG. 1c is merely exemplary, as there is no requirement to add redundant fabric-to-fabric links between any particular pair of fabrics, and that the number of links added in a given direction do not have to match the number of links added (if any) in an opposing direction. Moreover, the general concept may be extended to add still further fabric-to-fabric links between a given pair of fabrics, if desired.

Figure 3A:
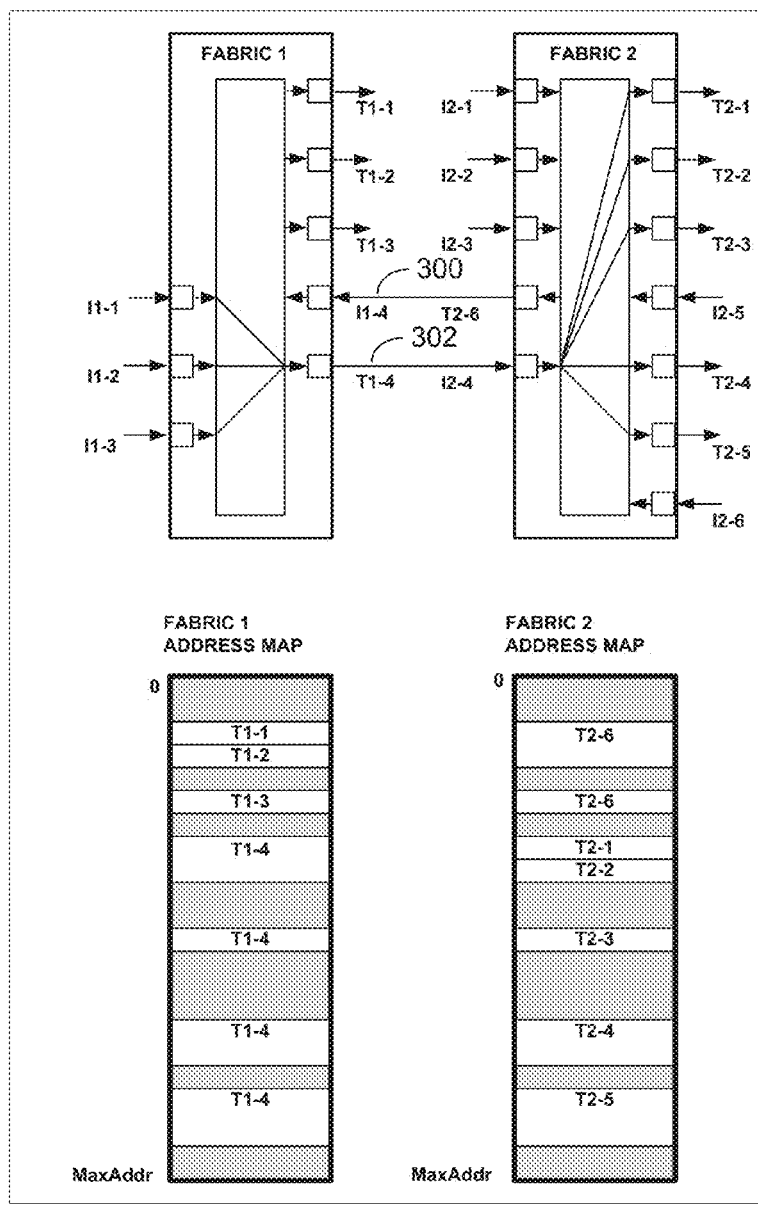
FIG. 3a shows various unidirectional links within a pair OCP fabrics, and a pair of fabric-to-fabric links between the OCP fabrics, and further depicts address maps for each of the OCP fabrics.
Figure 3B:
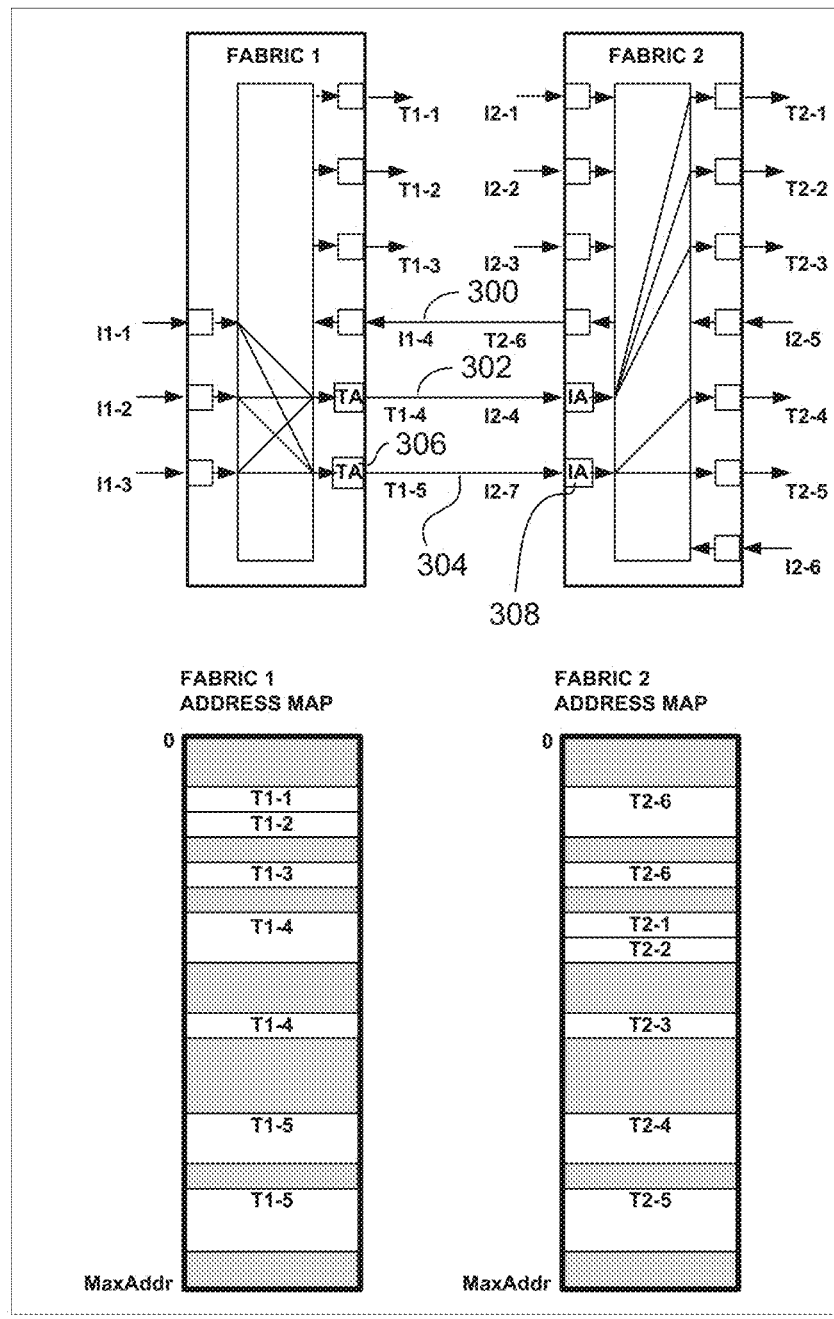
FIG. 3b shows the fabric configuration of FIG. 3a, further including a redundant fabric-to-fabric link between the OCP fabrics.
Figure 3C:
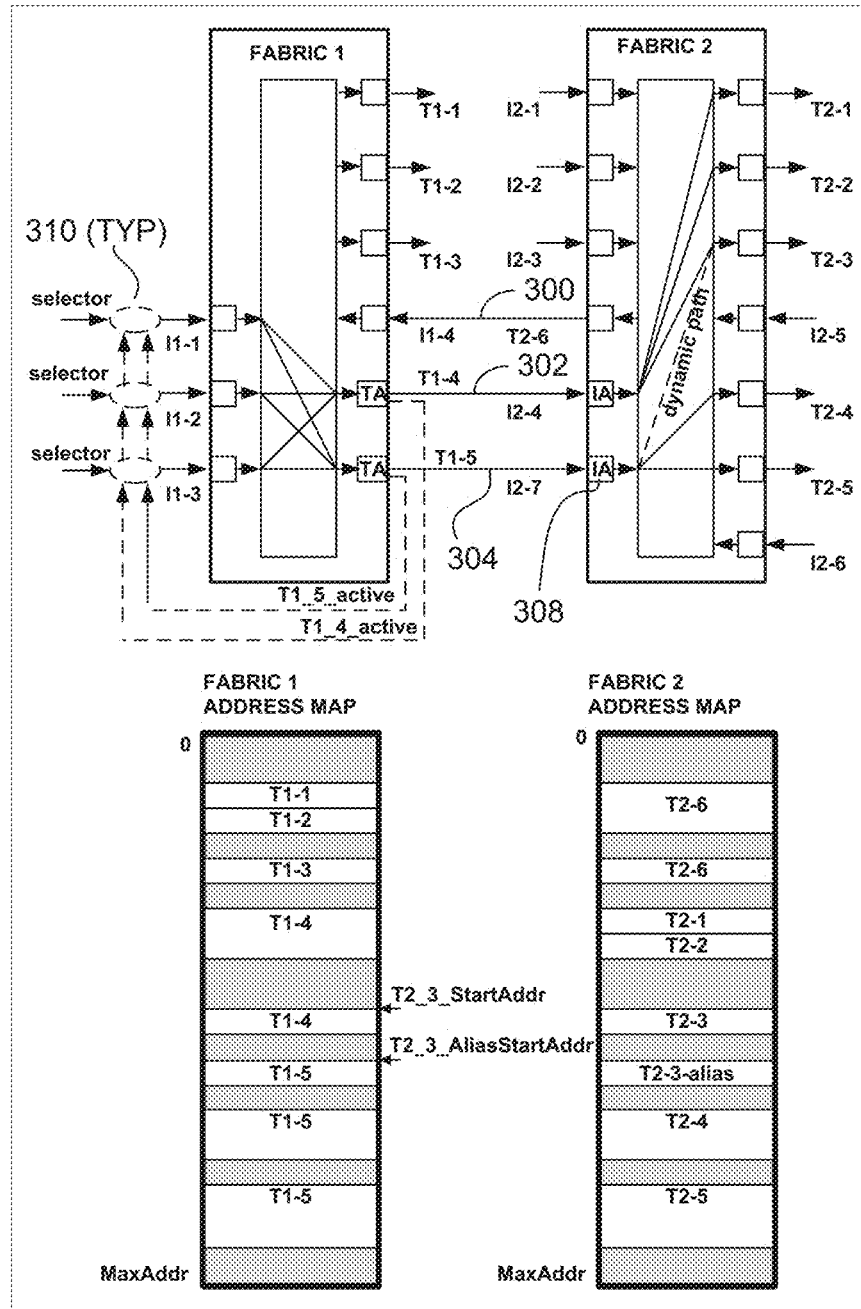
FIG. 3c shows a variation of the configuration of FIG. 3b, further including selector logic used for dynamically routing data from initiators to targets, and further showing corresponding modifications to the fabric address maps.

FIGS. 3a and 3b depict various OCP links internal to Fabrics 1 and 2 and fabric-to-fabric links 200 and 202 between Fabrics 1 and 2. For simplicity and clarity, only selected initiators and targets from those shown in FIGS. 1a-c are shown in FIGS. 3a-c. The initiators in FIGS. 3a-c are labeled 1x y, where x identifies the fabric and y identifies the particular initiator on that fabric. Similarly, targets are labeled Tx-y in FIGS. 3a-c. Also, to avoid clutter, the IP blocks corresponding to these initiators and targets are not shown in FIGS. 3a-c; however, it will be understood that such IP blocks would be coupled to the applicable fabrics in an actual implementation.

Both of FIGS. 3a and 3b depict common initiators, targets, and corresponding OCP point-to-point links. FIG. 3b further depicts the addition of a redundant fabric-to-fabric OCP link 304 between target agent (TA) 306 and initiator agent (IA) 308 of fabrics 1 and 2, respectively. The redundant link is realized by implementing a second instance of the link target agent (box labeled TA) logic in Fabric 1 and a second instance of the link initiator agent (box labeled IA) logic in Fabric 2 and connecting these agents with (physical) wires in accordance with the particular OCP link width to be implemented. The properties of the OCP bus of the original and redundant link are, hence, identical if the configuration of both fabric-to-fabric links 302 and 304 are the same. Further shown are additional OCP links between each of initiators I1-1, I1-2, and I1-3 and target agent 306, and between initiator agent 308 and targets T2-4 and T2-5. As illustrated, the addition of redundant fabric-to-fabric OCP link 304 provides a parallel data path to original shared fabric-to-fabric OCP link 302.

A modification is also made to the address map of both fabrics. The modification is done to enable an equitable partitioning of data paths between those that use the original shared link and those that use the redundant link. In FIG. 3*b*, the example partitioning shown is that pathways to targets T2-1, T2-2, and T2-3 continue to use the original shared link while pathways to targets T2-4 and T2-5 use the redundant shared link. (Note that with this partitioning, the two example pathways shown in FIG. 3*a* would now use different shared links and do not impose delays on each other.)

The lower portion of each of FIGS. 3*a-c* shows target address maps for the targets in Fabrics 1 and 2. Under OCP, point-to-point unidirectional links are routed between initiators and targets, and thus the destination address ranges of the targets are predefined for each fabric. Each target is assigned a fixed range of addresses, and since a given target can be accessed by multiple initiators, the address ranges for some targets may be larger and/or occupy multiple segments. This is particular true for target addresses corresponding to fabric-to-fabric OCP shared links. For example, notice that the address ranges for target T1-4 in Fabric 1 includes four segmented ranges, including three segments having a length that is longer than comparable segments for targets T1-1, T1-2, and T1-3.

The addressing scheme shown in FIG. 3*a* corresponds to the use of conventional shared fabric-to-fabric OCP links, while the addresses scheme in FIG. 3*b* corresponds to the addition of the added fabric-to-fabric link 204. To accommodate the new target T1-5, the highest two address ranges for T1-4 in FIG. 3*a* have been reallocated to T1-5 in FIG. 3*b*, while the rest of the address range mappings remain the same. Notice at the same time, this creates a partitioning of pathways between transfers across the original shared fabric-to-fabric link 202 and the added redundant fabric-to-fabric link 204. For example, transfers originating at initiators in Fabric 1 corresponding to targets T2-4 and T2-5 in Fabric 2 are now routed on fabric-to-fabric link 204.

FIG. 3*c* shows an optional enhancement that may be implemented to further improve data throughput. The enhancement seeks to opportunistically re-route a pathway that would normally use the original shared link to instead use the redundant link in the case where the original link is busy serving prior commands while the redundant link is idle (thus avoiding the wait time associate with clearing the previous commands). The details of the enhancement are as follows: A target that uses the original link (e.g., fabric-to-fabric link 302) is selected. In this case target T2-3. The address map region assigned to the target is examined. The starting address for the region is noted. In this case the address is T2_3_StartAddr. The size of the region is noted and from this the effective number of address bits is deduced as N. (N means that the size of the region is less than or equal to $2^N$ bytes.) The address map is searched for a suitable alias region. The alias region must be equal in size to the T2-3 region and be in (previously) unused space (grey area in the address map). In FIG. 2*c* such a region is found as T2-3-alias with starting address T2_3_AliasStartAddr. The address maps for the two fabrics are then updated such that if an address in the alias region is presented (by a Fabric 1 initiator), the pathway is routed through the redundant link (fabric-to-fabric link 304) to target T2-3 (using the dotted line labeled dynamic path). Finally, a (fully combinational) logic block, labeled Selector 310, is added (for each Fabric-1 initiator). The role to the Selector is, if appropriate, to multiplex in the alias version of the T2-3 address (that originally comes from the initiator) into Fabric-1.

In general, the use of the alias addressing scheme (and associated dynamic routing) is transparent to both initiators and targets. Accordingly, the target addresses used to by an initiator interface of an IP block to transfer data between an initiator and a target remains unchanged. Also, re-routing is not limited to routing from an original link to a redundant link. Rather, re-routing may also be applied to a command that by default would take the redundant link but instead could be dynamically switched over to the original link.

Figure 4:
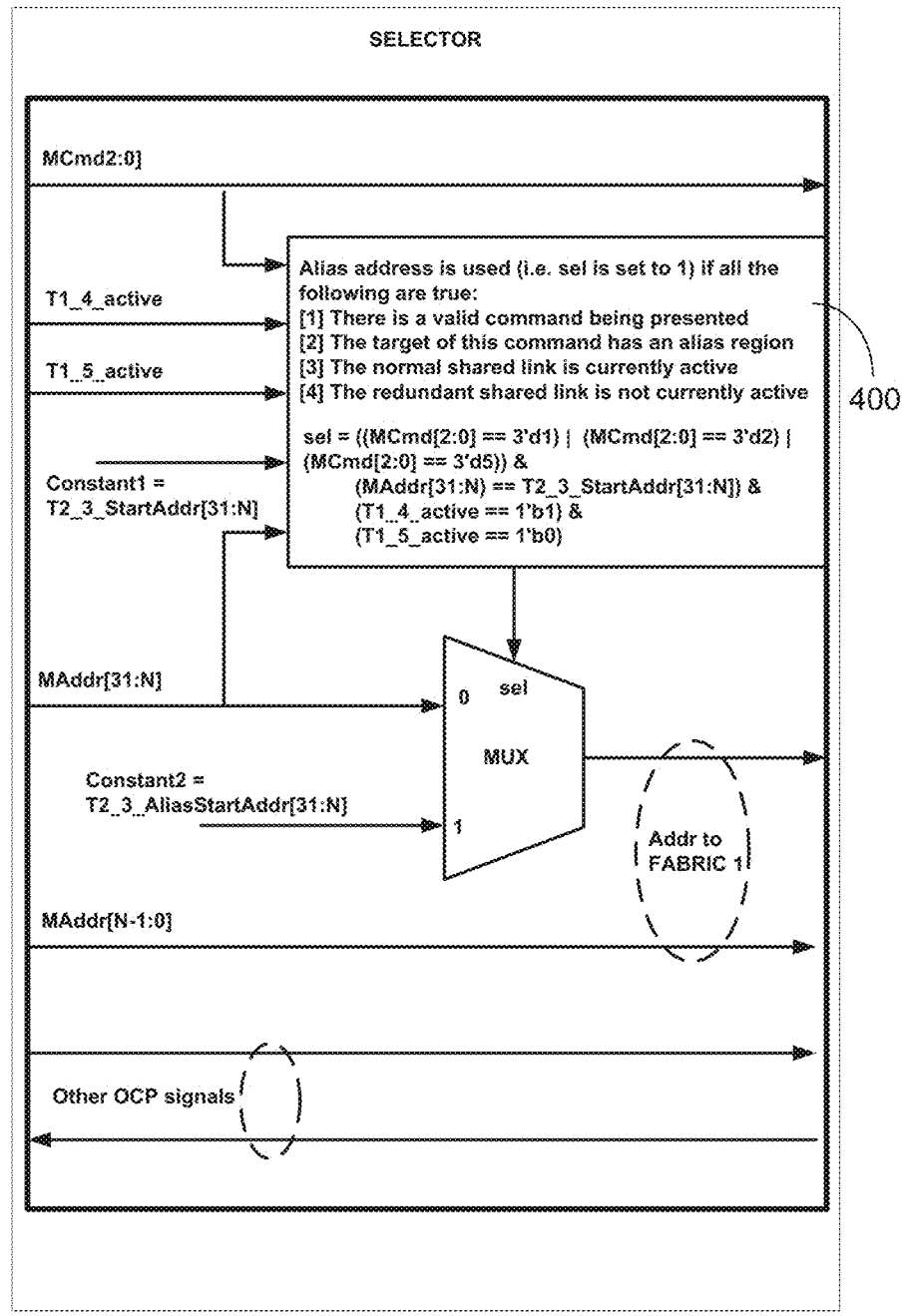
FIG. 4 is a diagram illustrating details of an implementation of the selectors of FIG. 3c, in accordance with one embodiment.

FIG. 4 shows exemplary implementation details of Selector 310, according to one embodiment. In general, most of the logic performed by Selector 310 is implemented via a logic block 400, which shows the logic used to determine whether or not to use an alias address or an original address. The exemplary implementation shown in FIG. 3 assumes a 32-bit address range for the fabrics, and generally employs standard OCP signals for most of the inputs, as presented above. Note, however that T1_4_active and T1_5_active are not OCP standardized signals but are signals that are generally available in typical fabric implementations. They indicate when the respective target agent (inside Fabric 1) is busy serving a previous request (i.e. still waiting for a previous command to fully complete). In cases where the _active signal is not available but the OCP signal SThreadBusy (and/or SDataThreadBusy) is available, this busy signal may be used instead. Alternatively, the OCP signal SCmdAccept (inverted) could be use if available and if the quiescent/idle state for the signal is high. The logic shown in logic block 400 may typically be implemented using standard embedded logic design techniques, such as using ASIC or FPGA logic design tools, programmed logic tools, etc.

As discussed above, the fabric architectures discussed herein may be representative of all or a portion of the fabrics used in an SoC. An example of the latter is depicted in FIG. 5, which shows an SoC architecture 500 including a North complex 502 and a South complex 100*d*. The North complex may typically include processor cores coupled to cache and memory components via a coherent fabric. Accordingly, North complex 502 is depicted to include a Central Processing Unit (CPU) 505 including a plurality of processor cores 506, each of which is coupled to a coherent fabric 508, such as a QPI fabric. Also shown coupled to coherent fabric 508 is a memory block 510—this memory block is intended to generally depict various memory-related components that may be present in the architecture such as caches, caching agents, memory controllers, etc. Generally, an SoC architecture will include one or more levels of on-chip caches, and may have some mass storage level memory on-chip or have one or more interfaces to off-chip memory; memory block 510 is intended to be representative of all of these configurations.

The North complex also includes another fabric such as an INTEL On-Chip Scalable Fabric (IOSF) or OCP fabric 512 operatively coupled to coherent fabric 508 via a fabric-to-fabric bridge 514. A plurality of IP blocks 516 are communicatively coupled to fabric 512. In addition to the components depicted in FIG. 5, North complex 502 may include further components and fabrics, as will be recognized by those skilled in the art.

South complex 100*d* is generally illustrative of the SoC architecture 100 and 100*c* discussed above. In comparison to Soc architecture 100*c*, South complex 100*d* only includes single unidirectional link pairs between Fabric 2 and Fabric 3, and between Fabric 4 and Fabric 5. As discussed above, this is merely illustrative of various link configurations in a hierarchical fabric that may be implemented in accordance with the teachings herein.

Also depicted in architecture 500 is an IOSF/OCP to OCP bridge 518. This is generally illustrative of a bridge that might be implemented between fabric 512 of the North complex and Fabric 1 of the South Complex, which in this configuration would comprise an OCP fabric (with fabric 512 comprising either an IOSF or OCP fabric). In cases where the fabric protocols differ, a fabric protocol bridge will be implemented. If both fabric 512 and Fabric 1 are OCP fabrics, then either an OCP fabric-to-fabric bridge may be used, or an OCP fabric-to-fabric link may be used, depending on applicable design parameters. For example, if the clock rate of fabric 512 is substantially different than the clock rate of Fabric 1, the bridge would support a clock domain crossing function, while still implementing OCP signals on both interfaces to the bridge.

Embodiments of the present disclosure discussed above may generally be implemented in an integrated circuit comprising a semiconductor chip using well-known design and manufacturing techniques. In one embodiment, fabric generation tools from Sonics, Inc., may be implemented to facilitate design implementations. Also, although depicted as being implemented on an SoC, the use of redundant fabric-to-fabric links with optional dynamic routing may be implemented on other types of components, including I/O chips, peripheral chips, controllers, and other types of integrated circuits.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. An integrated circuit, comprising:
   a first fabric to which a plurality of initiators are communicatively coupled;
   a second fabric to which a plurality of targets are communicatively coupled;
   first and second fabric-to-fabric links, each being a point-to-point interconnect between the first and second fabric and supporting communication between the first and second fabrics; and
   routing circuitry and associated logic, operatively coupled to the first and second fabric-to-fabric links,
   wherein the routing circuitry and logic is configured to dynamically route data originating from at least one initiator and destined for a target by selectively using one of the first or second fabric-to-fabric links to route the data from the at least one initiator to the target.

2. The integrated circuit of claim 1, wherein the routing circuitry is configured to route data between initiators communicatively coupled to the first fabric to targets communicatively coupled to the second fabric using the first fabric-to-fabric link by default, and further wherein the routing circuitry is configured to detect usage of the first fabric-to-fabric link, and upon detection of usage of the first fabric-to-fabric link concurrently with an initiator initiating a data transfer to a target communicatively coupled to the second fabric the data transfer is routed between the first and second fabrics using the second fabric-to-fabric link.

3. The integrated circuit of claim 1, wherein the routing circuitry is operatively coupled to at least one initiator fabric interface to which a corresponding initiator is communicatively coupled, and wherein dynamically routing using the first or second fabric-to-fabric link is effected by selecting an address that causes the data to be routed via one of the first or second fabric-to-fabric links.

4. The integrated circuit of claim 3, wherein the address corresponds to an alias address of a target agent interface of the first fabric.

5. The integrated circuit of claim 1, wherein each of the first and second fabrics comprises a plurality of unidirectional point-to-point interconnects, and wherein each of the first and second fabric-to-fabric links comprise unidirectional point-to-point interconnects having respective endpoints comprising the first and second fabrics.

6. The integrated circuit of claim 5, wherein the first and second fabrics comprise Open Core Protocol (OCP) fabrics, and each of the first and second fabric-to-fabric links comprise OCP links.

7. The integrated circuit of claim 1, further comprising:
   a third fabric to which at least one target is communicatively coupled; and
   a third fabric-to-fabric link, supporting communication between the second and third fabrics,
   wherein the routing circuitry is configured to selectively route data originating from an initiator communicatively coupled to the first fabric to a target communicatively coupled to the third fabric via one of the first and second fabric-to-fabric links.

8. A method, comprising:
   initiating a data transfer at an initiator communicatively coupled to a first fabric integrated on an integrated circuit, the data transfer destined for a target communicatively coupled to a second fabric integrated on the integrated circuit, the first and second fabrics communicatively coupled via first and second fabric-to-fabric links integrated on the integrated circuit; and selectively routing data corresponding to the data transfer from the initiator to the target via one of the first and second fabric-to-fabric links,
wherein each of the first and second fabric-to-fabric links is a point-to-point interconnect between the first and second fabrics.

9. The method of claim 8, wherein the fabrics comprise Open Core Protocol (OCP) fabrics, and the fabric-to-fabric links comprises OCP links.

10. The method of claim 8, wherein the fabrics employ unidirectional point-to-point links and each of the fabric-to-fabric links comprises a unidirectional point-to-point link.

11. The method of claim 8, wherein the selective routing operations used for transferring data from the initiator to the target are transparent to the initiator.

12. The method of claim 8, further comprising implementing the selective routing using embedded logic comprising a plurality of logic gates.

13. The method of claim 8, further comprising:
receiving a data transfer request at an initiator agent of the first fabric, the data transfer request identifying an address for the target;
determining an address of an alias target agent in the first fabric and coupled to the second fabric-to-fabric link based on the address for the target; and
routing the data transfer internally within the first fabric from the initiator agent to the target agent corresponding to the alias address.

14. The method of claim 8, further comprising:
detecting if the first fabric-to-fabric link is busy; and
if the first fabric-to-fabric link is busy, routing the data transfer via the second fabric-to-fabric link, otherwise routing the data transfer via the first fabric-to-fabric link.

15. A System on a Chip (SoC), comprising:
a plurality of Open Core Protocol (OCP) fabrics, having interfaces compliant with the Open Core Protocol, including at least a first and second OCP fabric;
a plurality of Intellectual Property (IP) blocks, each communicatively coupled to one of the plurality of OCP fabrics, at least a portion of the IP blocks including an interface for communicating with other IP blocks via the OCP fabric it is communicatively coupled to, the interface for each of such IP blocks including one of an initiator interface, a target interface, or both an initiator and target interface;
first and second fabric-to-fabric OCP links, each being a point-to-point interconnect between the first and second OCP fabrics and supporting communication between the first and second OCP fabrics;
routing circuitry and associated logic, operatively coupled to the first and second fabric-to-fabric OCP links,
wherein the routing circuitry and logic is configured to route data originating from an initiator of a first IP block communicatively coupled to the first OCP fabric and destined for a target interface of a second IP block communicatively coupled to the second OCP fabric by selectively using one of the first or second fabric-to-fabric OCP links to route the data from the first IP block to the second IP block.

16. The SoC of claim 15, wherein the plurality of fabrics are interconnected using a plurality of links to form a hierarchical fabric structure.

17. The SoC of claim 15, wherein the SoC includes a North complex and a South complex, and the plurality of OCP fabrics are implemented in the South complex.

18. The SoC of claim 15, wherein the routing circuitry is configured to route data between IP blocks including an initiator interface communicatively coupled to the first fabric to IP blocks including a target interface communicatively coupled to the second fabric using the first fabric-to-fabric OCP link by default, and further wherein the routing circuitry is configured to route the data using the second fabric-to-fabric OCP link if the first fabric-to-fabric OCP link is determined to by busy.

19. The SoC of claim 15, wherein the routing circuitry is operatively coupled to at least one initiator fabric interface to which a corresponding initiator interface of an IP block is communicatively coupled, and wherein selectively routing using the first or second fabric-to-fabric OCP link is effected by selecting an address that causes the data to be routed via one of the first or second fabric-to-fabric OCP links.

* * * * *